United States Patent [19]

Hagemeyer

[11] Patent Number: 5,669,531
[45] Date of Patent: Sep. 23, 1997

[54] CONVEYOR FOR PARTICULATE MATERIAL

[75] Inventor: Roland L. Hagemeyer, Rochelle, Ill.

[73] Assignee: The Louis Berkman Company, Steubenville, Ohio

[21] Appl. No.: 412,969

[22] Filed: Mar. 29, 1995

[51] Int. Cl.[6] ............................................. B67D 5/32
[52] U.S. Cl. ............... 222/153.14; 198/671; 222/413; 222/539; 414/526
[58] Field of Search ............... 222/153.14, 412, 222/413, 534, 539; 414/326, 526; 198/671

[56] References Cited

U.S. PATENT DOCUMENTS

| | | | |
|---|---|---|---|
| 3,158,375 | 11/1964 | Vig | 275/8 |
| 3,420,451 | 1/1969 | Kahlbacher | 239/666 |
| 3,610,474 | 10/1971 | Usher | 222/178 |
| 4,162,766 | 7/1979 | Ten Broeck et al. | 239/656 |
| 4,352,426 | 10/1982 | Peterson, Jr. | 198/671 |
| 5,085,025 | 2/1992 | Gaddis | 414/526 X |
| 5,199,634 | 4/1993 | Fischer | 414/526 X |
| 5,217,108 | 6/1993 | Newnan | 222/413 X |
| 5,222,634 | 6/1993 | Hayes | 222/413 X |

FOREIGN PATENT DOCUMENTS 2201390  9/1988  United Kingdom ............... 198/671

*Primary Examiner*—Joseph Kaufman
*Attorney, Agent, or Firm*—Vickers, Daniels & Young

[57]  ABSTRACT

A conveyor for particulate matter is provided with a channel extension movable between a use position aligned with the channel and a non-use position displaced relative to the channel. The extension includes an angled edge which cooperates with the auger flighting to shear material as it leaves the extension to break apart lumps which form in the material and provide an even flow of material from the conveyor.

33 Claims, 10 Drawing Sheets

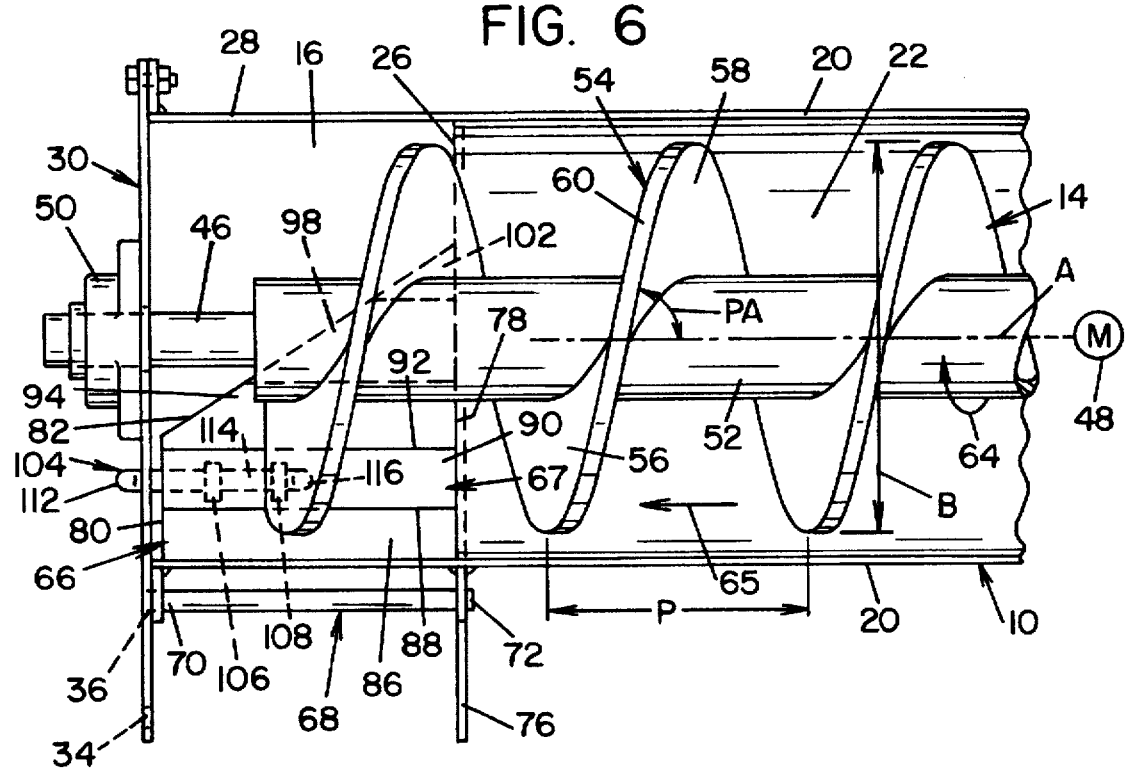
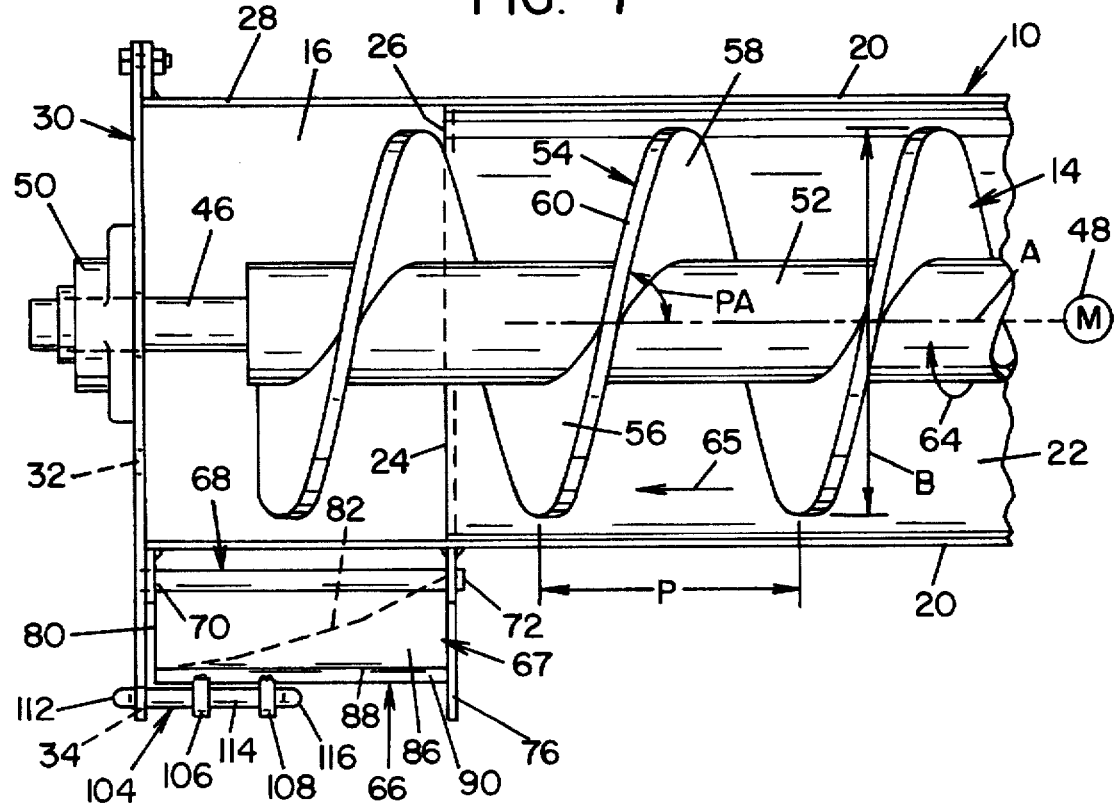

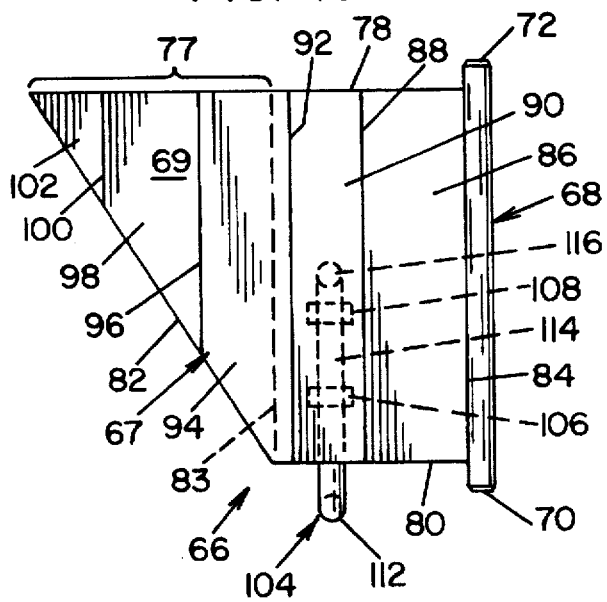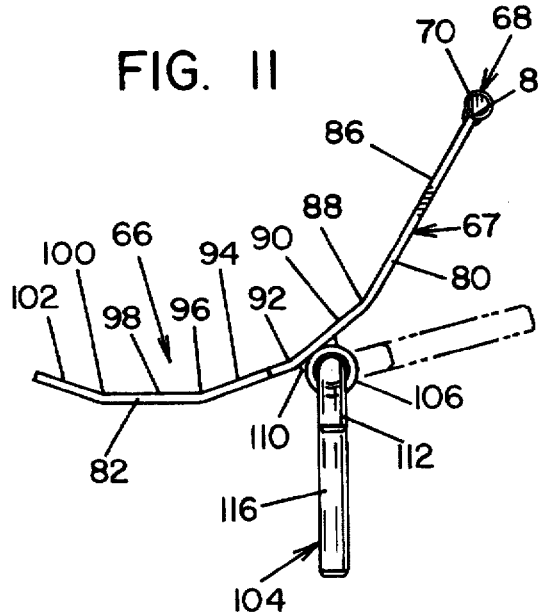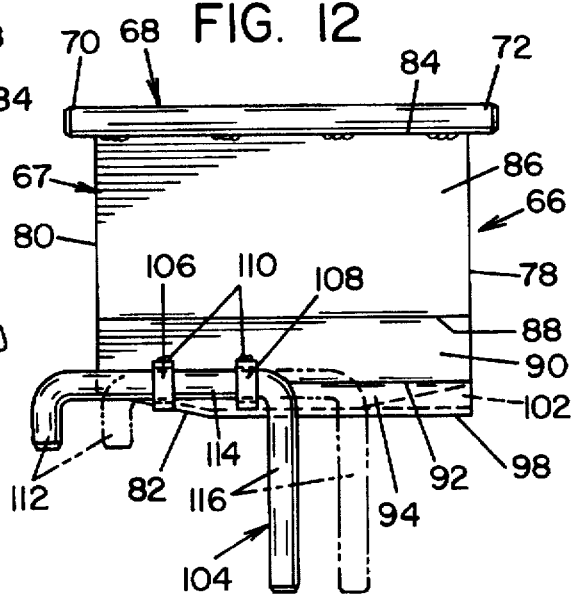

CONVEYOR FOR PARTICULATE MATERIAL

The present invention is directed toward a spreader having an improved conveyor discharge mechanism and more specifically, toward a spreader having an improved conveyor discharge mechanism to provide an even output of material under a variety of conditions.

BACKGROUND OF THE INVENTION

Many types of conveyors are in common use for moving bulk material along a horizontal or inclined trough or channel from a point of storage to a point of discharge across an edge transverse to the trough. Among the materials commonly moved in this manner are sand, grain, salt, coal and similar materials which will flow when pushed by a conveyor. Two common types of conveyors are auger conveyors (also known as screw or worm conveyors) and flight conveyors. Both types of conveyors are well known and in widespread use; however, under certain conditions, neither is capable of evenly expelling material from the channel in which it is mounted. For example, if material is fed to a flight conveyor so that it does not completely fill the spaces between the flights, material will leave the channel in pulses with pauses between each pulse. This problem is aggravated when the conveyor runs at a slow speed where the pauses are longer and more noticeable. An auger conveyor provides a generally steady output under many conditions, but when used to move a material such as damp sand or salt which tends to clump together, the output can also be uneven as clumps form which overhang the transverse discharge edge of the channel or trough before suddenly breaking off and falling. This clumping is due to the fact that damp material overhanging the discharge edge of the channel sticks to the material remaining in the channel. Here too, the problem is particularly noticeable when the conveyor is run at a slow speed due to the presence of empty spaces, between the flights. These problems make such conveyors unsuitable for applications which require a steady, even output of material from the conveyor unless a metering device of some sort is used to compensate for the irregularities in the output rate. Such metering devices add to the cost and complexity of what is otherwise a simple system.

One application where conveyors, especially auger-type conveyors are used is in conjunction with spreaders for spreading sand or rock-salt on roads. The auger may be mounted at the bottom of a V-shaped container on a truck bed or in a dump truck to move salt or sand toward the back of the truck where it is dropped across a transverse dispensing edge onto a spinning distribution plate or directly onto the road. Alternately, the auger can be mounted transversely at the front or back of a dump unit of a dump truck to move salt to one side of the truck and onto a distribution plate or chute to direct the salt onto the road. When salt or sand is being dispensed at a high rate, material is expelled fairly evenly across the transverse dispensing edge and small fluctuations in the flow caused by clumpiness or the flighting passing over the edge of the channel are unnoticeable. However, when the auger is turning at a slower speed, these irregularities will cause material to be distributed unevenly on a road surface. That materials such as salt and sand are often stored outdoors and used in inclement weather increases the likelihood that they will be damp and not flow evenly. Even material which flows freely will not be dispensed at a steady rate due to the way that material is distributed between the flights of the auger. This can result in icy patches remaining on a roadway after a salt spreader passes or require that material be wastefully applied at a higher rate than necessary in order to ensure adequate coverage. It is therefore desirable to provide a spreader with a conveyor which provides an even flow of material at low output rates but is also capable of distributing material at high output rates.

SUMMARY OF THE INVENTION

The foregoing problems and others are addressed by the present invention which comprises a channel or trough extension having a dispensing edge at an acute angle to the channel axis which evens the flow of material leaving the conveyor channel by increasing the length of the dispensing edge and slowing the instantaneous dispensing rate of the material while keeping the average rate constant.

Material is dispensed when it passes over the dispensing edge. When the dispensing edge is normal to the direction of material flow, material tends to be dispensed in pulses. This is because the amount of material between the flights varies, with more material immediately in front of a flight and little or no material directly behind it. By providing a channel extension having a dispensing edge angled with respect to the direction of flow of the auger axis, a relatively constant output rate is achieved. This is because the distance between the flight and the dispensing edge varies for points laterally spaced across the channel. It thus takes longer for some portions of material to reach the dispensing edge than for other portions. The angled edge thus serves to stagger the times at which material is dispensed and prevents large pulses from passing over the edge all at once. The extension may be constructed as an integral part of the channel or trough itself or it may comprise a movable plate which can be moved away from the channel under high output conditions where fluctuations in flow are less noticeable.

In a first embodiment of the invention, the extension comprises a plate bent to generally conform to the shape of the terminal end of a channel or trough and pivotably mounted so that it may be swung away from the channel when not needed.

In a second embodiment, the plate has a shape similar to the plate in the first embodiment, but is slidably mounted beneath the conveyor channel for storage in a non-use position and may be extended from beneath the channel to a use position when needed.

It is therefore a principal object of the present invention to provide an improved conveying device for dispensing particulate material at an even rate.

It is another object of the present invention to provide a device of the foregoing character for evenly dispensing particulate material and which device functions over a range of different feed or dispensing rates.

It is a further object of the present invention to provide a device of the foregoing character having a conveyor channel extension configured to provide a steady flow of material from the channel.

It is yet a further object of the present invention to provide a conveyor channel extension having a dispensing edge at an acute angle to the direction of material discharge to promote an even distribution of particulate material by delaying the dispensing of a portion of the material.

It is yet another object of the present invention to provide a device of the foregoing character for use with an auger type conveyor to promote a steady output rate of particulate material at low auger speeds.

It is still another object of the present invention to provide a device of the foregoing character which is attachable to an existing conveyor of a spreader for evenly spreading particulate material on a road surface at low application rates.

It is a further object of the present invention to provide a conveyor channel extension of the foregoing character in the form of a movable plate mountable at the end of a conveyor channel for displacement between use and non-use positions relative thereto.

BRIEF DESCRIPTION OF THE DRAWINGS

The foregoing and other objects of the present invention will become apparent after reading the following description of the invention in connection with the accompanying drawing in which:

FIG. 6 is a plan view of the spreader portion shown in FIG. 2;

FIG. 7 is a plan view of the spreader portion shown in FIG. 3;

FIG. 10 is a plan view of the extension plate of a spreader according to the present invention;

FIG. 11 is an elevation view of the extension plate;

FIG. 12 is a side elevation view of the extension plate;

DETAILED DESCRIPTION OF THE PREFERRED EMBODIMENTS

Figure 1:
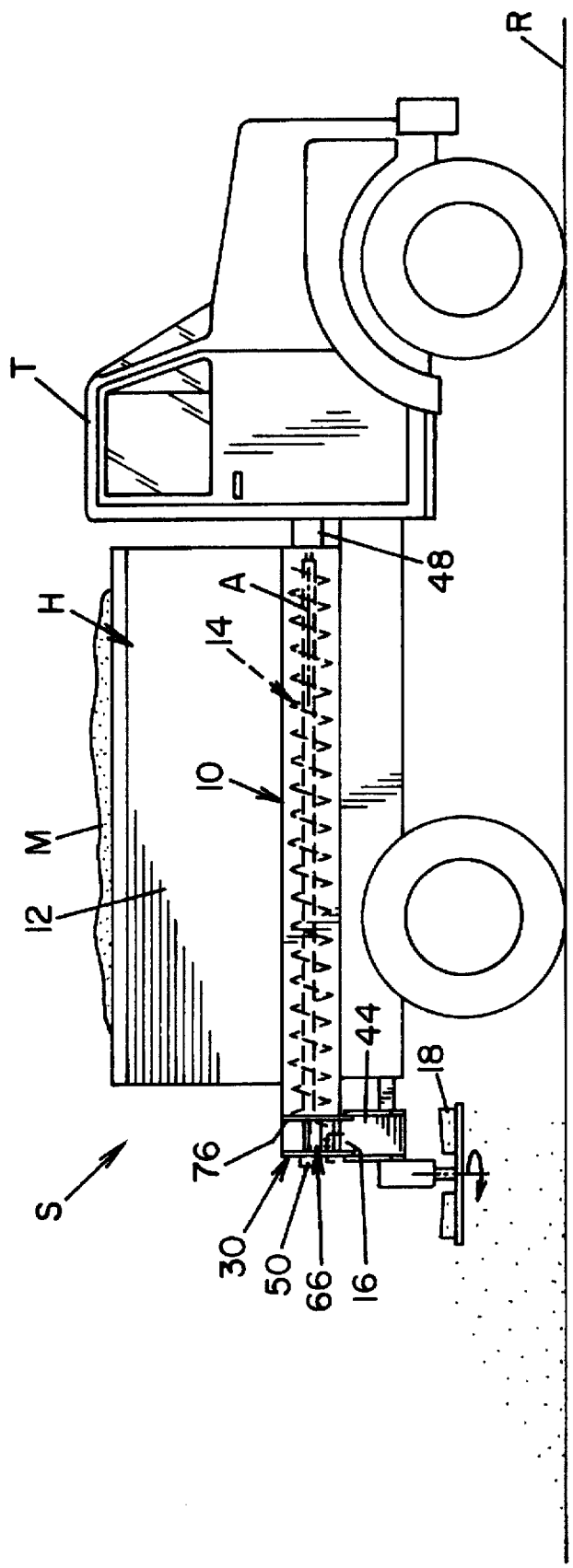
FIG. 1 is a schematic side elevation view of a truck having a spreader according to the present invention mounted thereon.

Referring now to the drawings wherein the showings are for the purpose of illustrating preferred embodiments of the present invention only and not for the purpose of limiting same, FIG. 1 schematically shows a spreader S which comprises a hopper H mounted on a truck T for spreading material M such as salt, sand, or cinders on a road R. Hopper H includes an open top channel 10 running longitudinally along the bottom thereof, slanted side walls 12 for directing material into the channel, and an auger 14 mounted therein and rotatable about an axis A for moving material M toward an opening 16 at the rear of the channel. The auger moves material along the channel causing it to fall out of opening 16 onto road surface R or onto a rotating broadcasting apparatus 18 which spreads the material in a broad pattern. Such spreaders are in widespread use alone or in connection with snowplow equipped trucks for ice and snow removal and are well known in the art.

Figure 2:
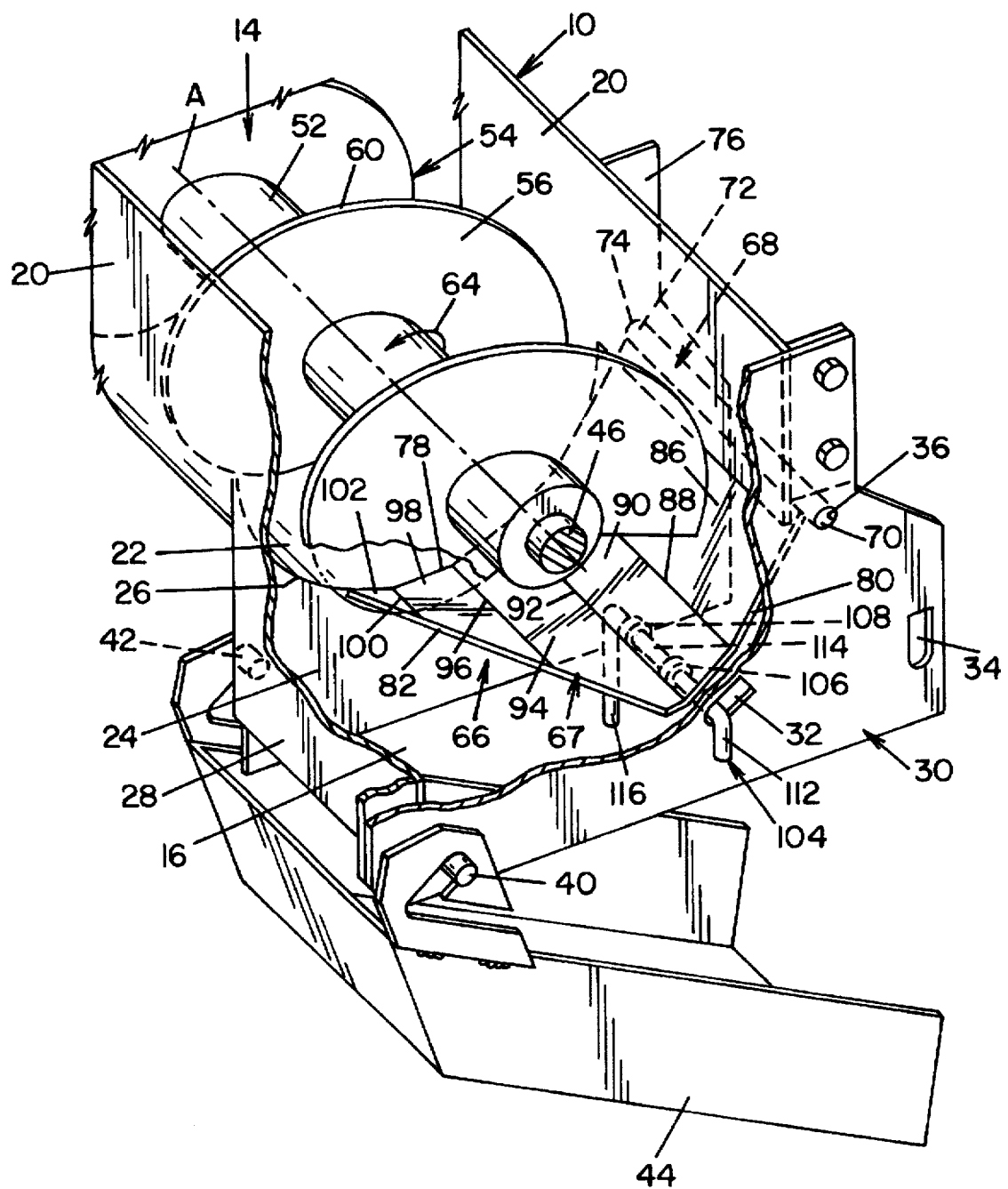
FIG. 2 is a perspective view of the dispensing end portion of an auger and channel for use with a spreader as shown in FIG. 1 and having an extension plate according to the present invention positioned for use.
Figure 3:
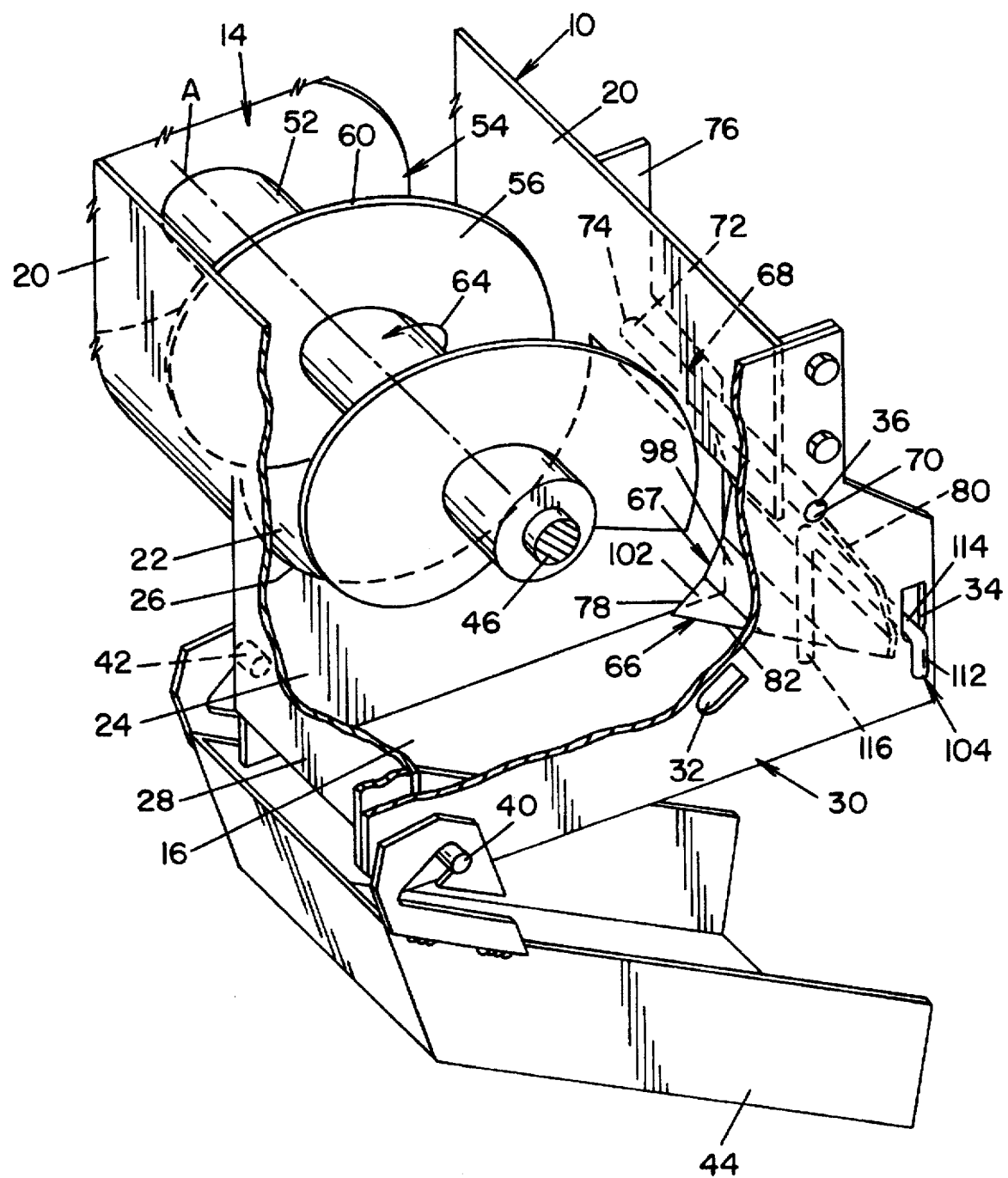
FIG. 3 is a perspective view similar to FIG. 2 and showing the extension plate moved away from the channel for bulk conveying.

FIGS. 2 and 3 show, in detail, channel 10, auger 14, and opening 16. Channel 10 comprises generally vertical side walls 20 connected by an arcuate channel bottom 22. Opening 16 is bounded by several walls so that material passing through opening 16 drops downwardly toward a road surface or a distributing device such as broadcaster 18. These walls include an inner wall 24 which meets channel bottom 22 to provide an arcuate lip or edge 26 transverse to axis A, side walls defined in part by axial extensions of channel side walls 20 beyond wall 24, and on one side, by a wall portion 28 depending from the corresponding channel side wall 20, and an outer end wall 30 attached to channel side walls 20 and wall portion 28. Walls 24, 28 and 30 extend downwardly of channel bottom 22 and serve to direct material M downwardly at the discharge end of auger 14. End wall 30 includes a laterally inner slot 32 and a laterally outer slot 34 for the purpose which will be described hereinafter. End wall 30 also includes a support pin 40 which, in conjunction with a support pin 42 on inner wall 24, serves to support a pivotal chute 44, or other directional devices that are well known in the art, and which chute in the present embodiment directs material M onto broadcaster 18.

As can best be seen in FIGS. 6 and 7, auger 14 comprises a sleeve 52 disposed around a shaft 46 and suitably secured thereto for rotation therewith, and a helical flighting 54 running the length of sleeve 52. Flighting 54 has a width B normal to axis A and includes a front face 56, a rear face 58 and a helical edge 60, and the flights have a pitch length B and a pitch angle PA relative to axis A. Pitch angle PA is preferably around 75 to 80 degrees. Flighting 54 is angled with respect to transverse lip 26 at an angle FA. Auger 14 is driven by shaft 46 which is turned by a motor 48. Shaft 46 runs through the length of auger 14 and passes through an opening therefor in end plate 30 and into a bearing housing 50 mounted on end plate 30 and which supports shaft 46 for rotation therein in a well known manner. Auger 14 rotates in the direction of arrow 64 which is counterclockwise as seen in FIGS. 2, 3, 8 and 9. As auger 14 rotates, the helical flighting pushes material along channel 10 in the direction of arrow 65 and over lip 26 as depicted in FIGS. 4A, 4B, 5A and 5B. The rate of rotation of auger 14 therefore determines the rate at which material is dispensed from opening 16. Approximately one pitch of the auger flighting extends beyond lip 26 and is disposed above opening 16.

Figure 8:
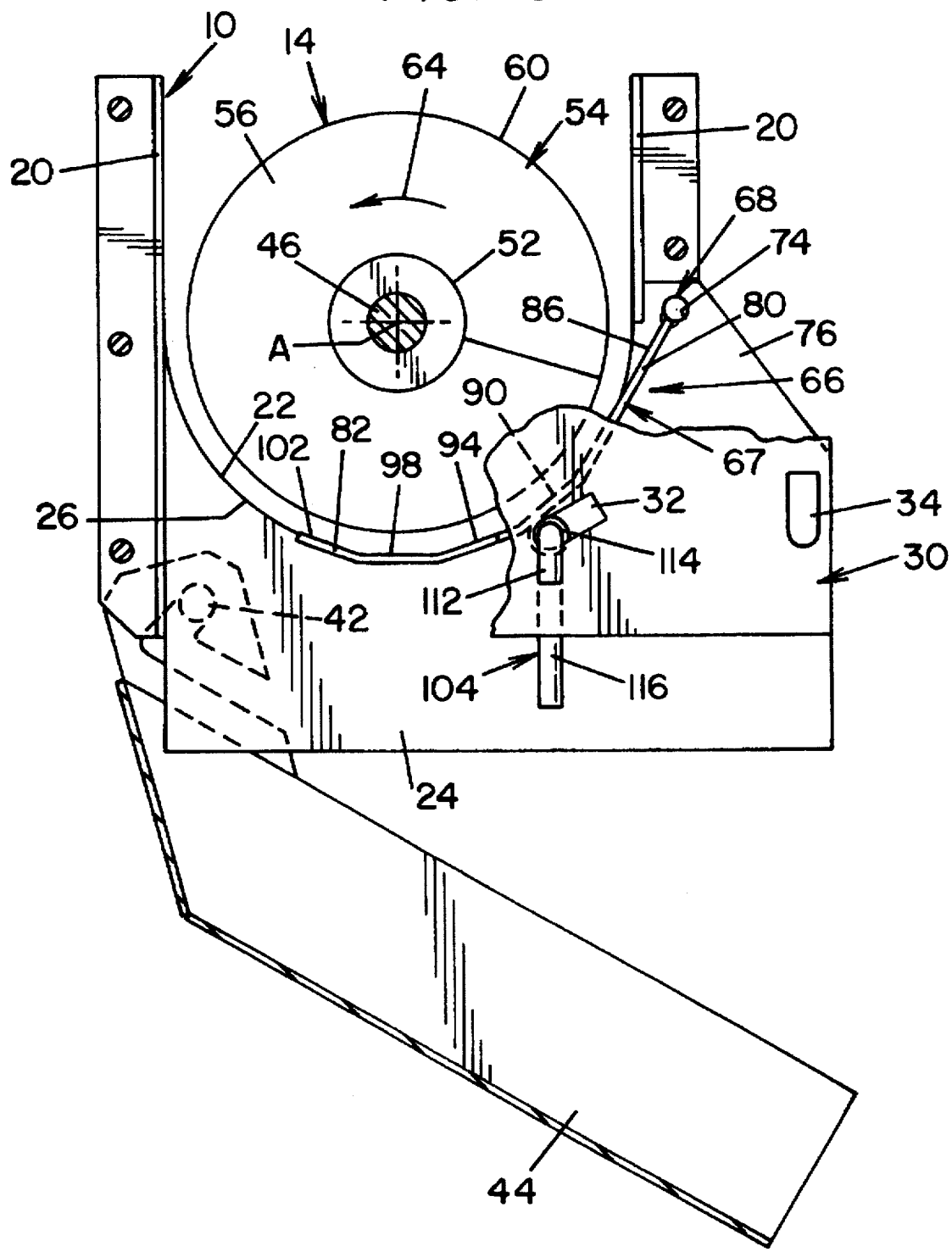
FIG. 8 is an end elevation view of the spreader portion shown in FIG. 2.
Figure 9:
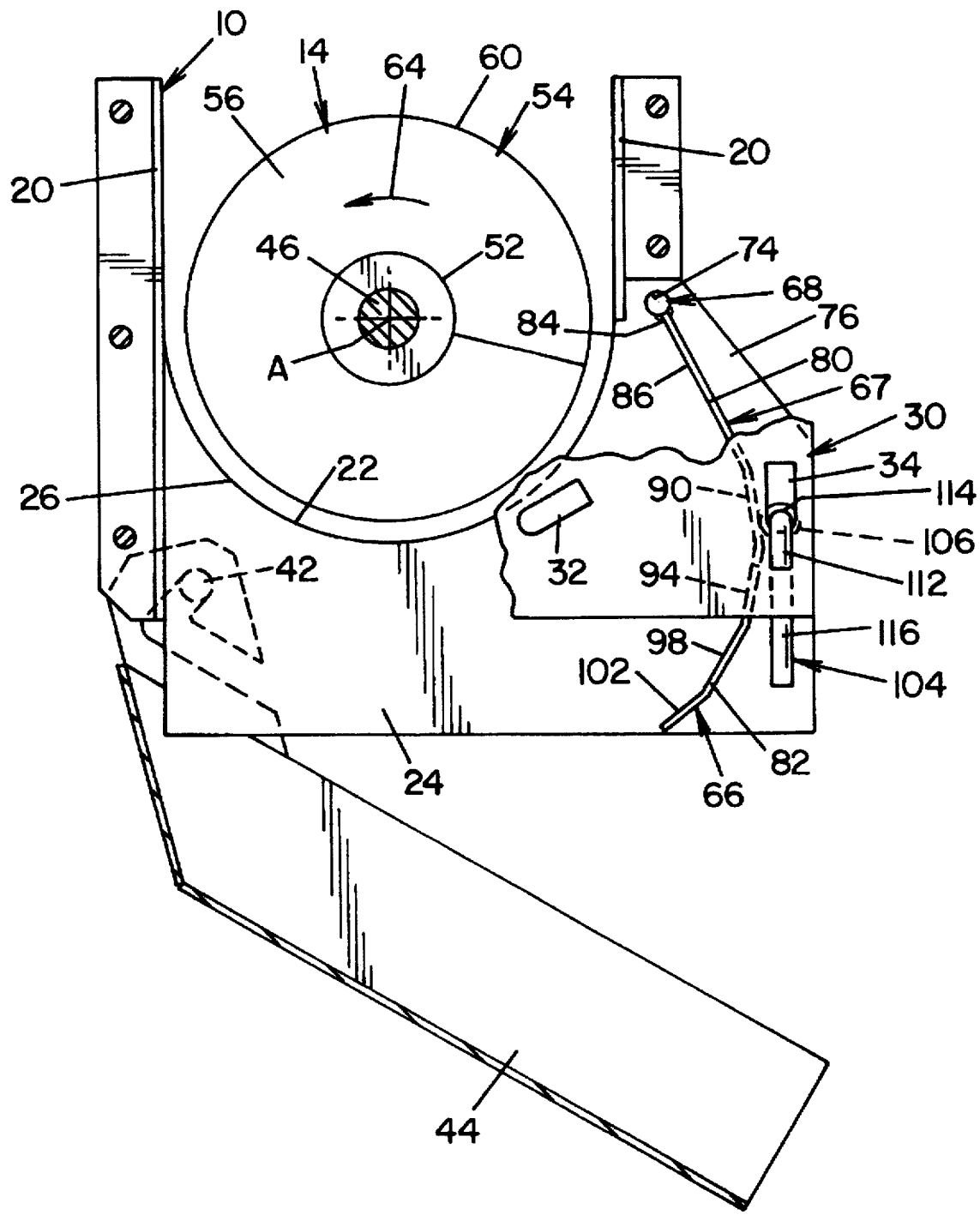
FIG. 9 is an end elevation view of the spreader portion shown in FIG. 3.

The improvement of the present invention comprises a flow plate 66 which, as best seen in FIGS. 2 and 10–12, includes a sheet portion 67 and a rod 68. Flow plate 66 is pivotally mounted on channel 10 and is moveable between a first, or use, position in which sheet portion 67 extends laterally across a portion of opening 16 and is aligned with and forms a partial extension of channel 10 as seen in FIGS. 2, 6 and 8, and a second or non-use position wherein sheet portion 67 is disposed generally vertically and adjacent one of the side walls providing opening 16 substantially out of the way of the material being dispensed across lip 26 of channel 10, as seen in FIGS. 3, 7 and 9. Flow plate 66 is pivotally supported by rod 68 which is attached along one edge of sheet portion 67 such as by welding. The rod has a first end 70 pivotally mounted in opening 36 in end plate 30 and a second end 72 pivotally mounted in an opening 74 in a support wall 76 extending laterally outwardly from the corresponding side wall 20 of channel 10. While support wall 76 is shown attached to a side wall 20 of the channel, it could also be formed as part of truck T or as part of the hopper H depending on the configuration of the spreader. Rod 68 is free to rotate in openings 36 and 74 and thus sheet portion 67 of flow plate 66 is pivotable about the axis of rod 68 and which axis is generally parallel to auger axis A.

Sheet portion 67 includes an axially inner edge 78, an axially outer edge 80, a laterally inner angled side edge 82 and a laterally outer side edge 84 to which rod 68 is welded. Side edge 82 is angled with respect to flighting 54 at an angle BA. Sheet portion 67 is preferably formed from 7 gauge sheet steel but may be formed from any suitable material which can stand up to abrasive and/or corrosive conditions associated with the spreading of salt or sand. Sheet portion 67 could be evenly curved to conform to the contour of channel 10, but in the preferred embodiment is comprised of a plurality of planar sections which meet at angles which makes the plate easy to manufacture. Specifically, as best seen in FIGS. 10 and 11, sheet portion 67 is trapezoidal in peripheral contour and includes a plurality of bends parallel to rod 68 which separate sheet portion 67 into a plurality of laterally adjacent generally planar sections. A first section 86 is rectangular and is defined by edges 78, 80 and 84 and a first bend 88 parallel to edge 84; a second section 92 is also rectangular and is defined by edges 78 and 80, first bend 88, and a second bend 92 parallel to first bend 88; a third section 94 is pentagonal and is defined by edges 78, 80 and 82, second bend 92, and a third bend 96 parallel to bend 92; a fourth section 98 is quadrilateral and defined by edges 78 and 82, third bend 96, and a fourth bend 100 parallel to bend 96; and a fifth section 102 is triangular and defined by inner edges 78 and 82 and fourth bend 100. The angle between the plane of first section 86 and the plane of fifth section 102 is approximately 70 to 90 degrees and preferably around 80 degrees. The bend between each section is approximately 20 degrees which results in plate portion 67 being generally aligned with bottom 22 of channel 10 over about an 80 degree arc when the flow plate is in the first position shown in FIG. 8. Rod 68 is mounted slightly higher than axis A of shaft 46 and the bends in plate portion 67 cause flow plate 66 to conform approximately to the curvature of channel bottom 22. As can be seen in FIG. 8, plate portion 67 extends laterally across approximately ⅔ of the arcuate extent of channel bottom 22. Third section 94 is disposed partially beneath auger sleeve 52, fourth section 98 is disposed beneath sleeve 52 and shaft 46 and is approximately horizontal, and fifth section 102 is partially disposed beneath sleeve 52.

Flow plate 66 is movable between a first or use position underlying and aligned with channel 10 as shown in FIGS. 2, 6 and 8 and a second non-use position in which it depends from and is positioned to one side of channel 10 as shown in FIGS. 3, 7 and 9. Displacement of flow plate 66 between the two positions is achieved through a control arm 104 pivotally attached to the underside of plate portion 67 between bend 88 and bend 92 by a pair of spaced apart brackets 106 and 108 welded to plate section 90. Arm 104 has a first end portion 112, a central portion 114 and a second end portion 116 all of which have a circular cross-section. Central portion 114 passes through brackets 106 and 108 and is loosely supported therein so that portion 114 can rotate within the brackets and also slide back and forth therein in a direction parallel to that of rod 68. End portions 112 and 116 join central portion 114 at right angles and prevent arm 104 from sliding out of brackets 106 and 108. In the use position of flow plate 66 shown in FIG. 2, end 112 extends through slot 32 and downwardly along the outer side of wall 30 to releasably hold the flow plate in its use position. By turning control member 104 through the use of end 116, end 112 can be aligned with slot 32 and withdrawn therethrough to release flow plate 66 for pivotal movement to its non-use position shown in FIG. 3. At the latter position, the control member is turned to align end 112 with slot 34, is displaced to move end 112 through the slot and is then released for end 112 to extend downwardly along the outer side of wall 30. In this manner, slots 32 and 34 support arm 104 which in turn holds plate 66 steadily in the corresponding one of its use and non-use positions.

Figure 4A:
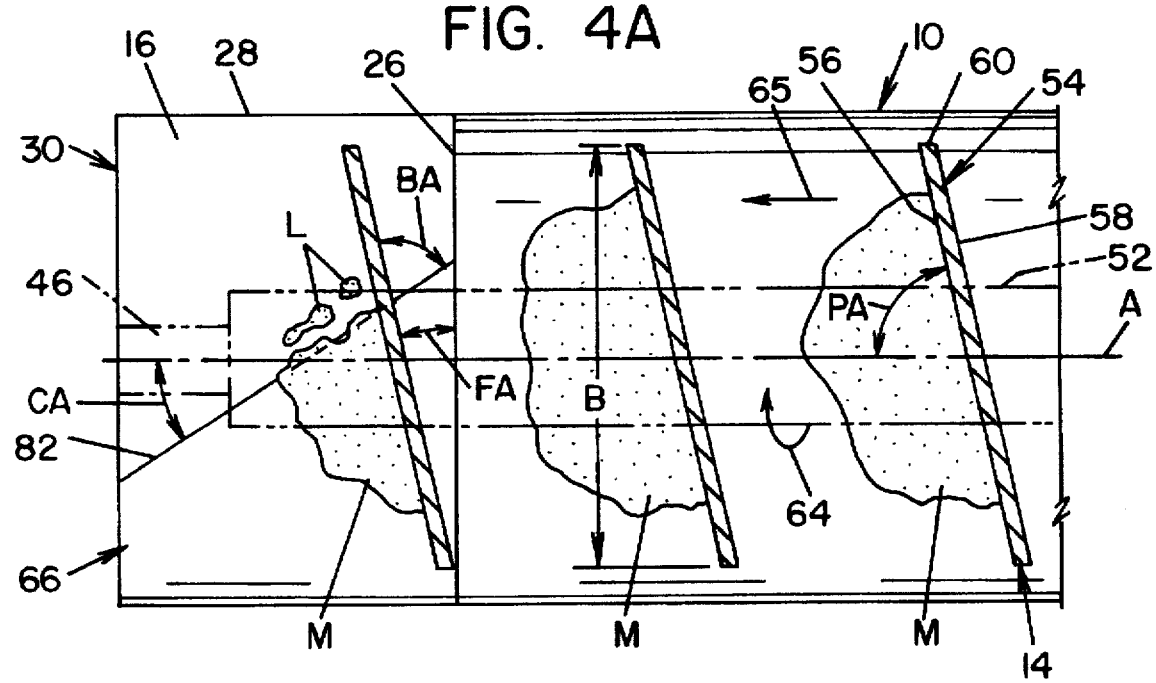
FIGS. 4A and 4B are plan views of the auger and channel in FIG. 2 schematically showing how the plate delays the dispensing of a portion of material to provide an even output rate.
Figure 4B:
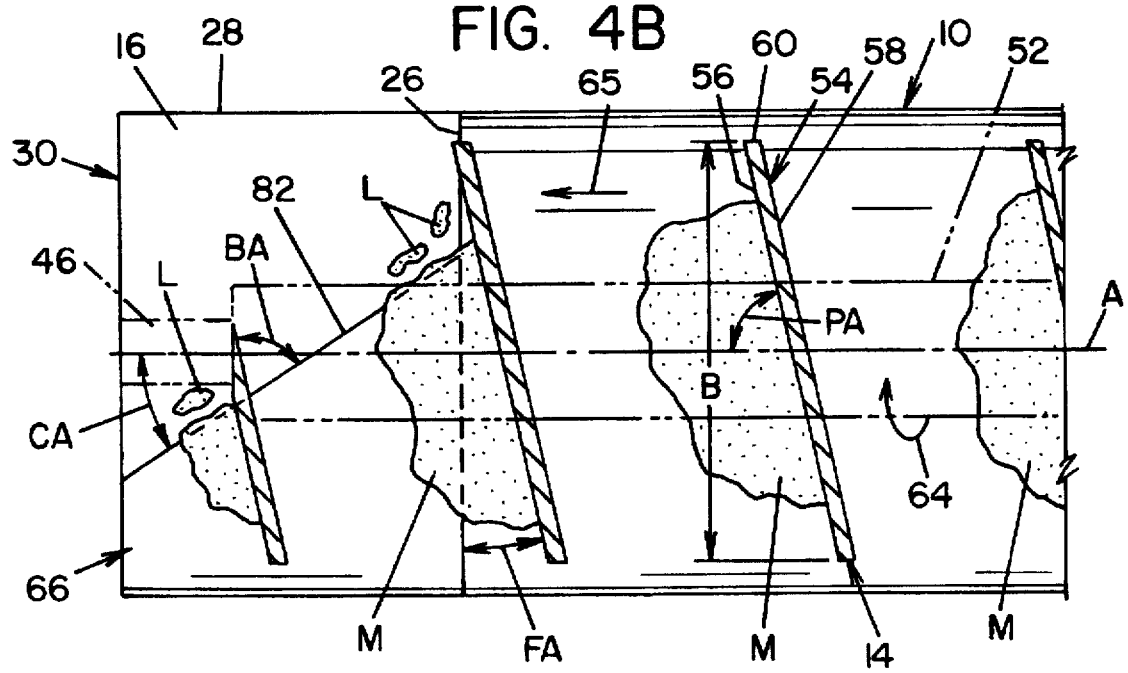
Figure 5A:
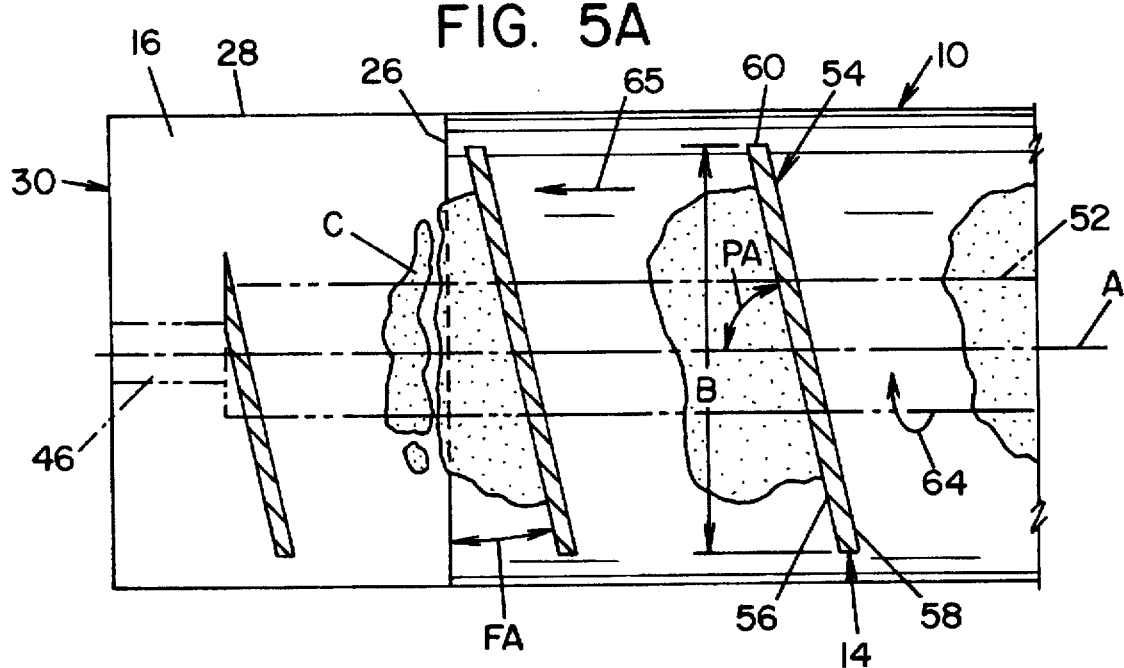
FIGS. 5A and 5B are plan views of the auger and channel in FIG. 3 schematically showing how the auger dispenses clumps of material when the plate is not in use.
Figure 5B:
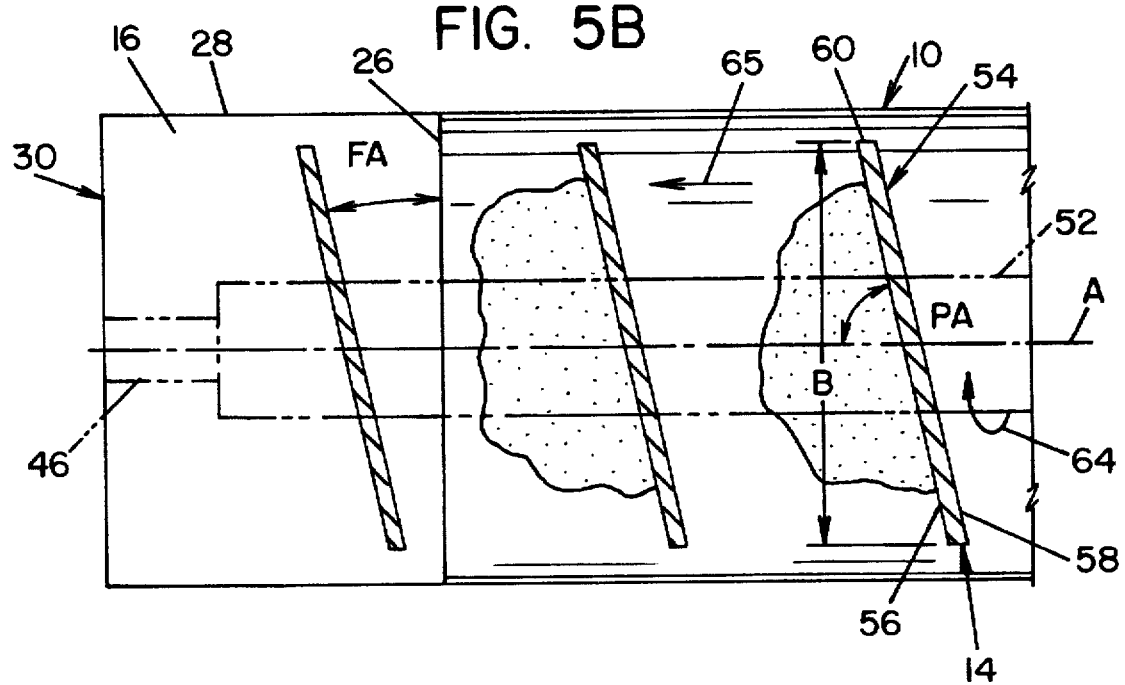

The problem overcome in accordance with the subject invention can best be understood by reference to FIGS. 4A, 4B, 5A and 5B which schematically show material M being moved along channel 10 by auger 14. FIGS. 5A and 5B show how the empty spaces between flights cause the material to be dispensed intermittently. This problem is aggravated when material such as wet salt or sand is being dispensed because it tends to fall off of transverse lip 26 and through opening 16 in large clumps C when no flow plate is present. At low auger speeds, this problem is particularly noticeable. The present invention solves these problems by positioning flow plate 66 to extend axially outwardly from lip 26 and by providing the plate with a dispensing or terminal end edge 82 which is angled with respect to axis A at an angle CA and also angled with respect to the pitch angle PA of flight 54. This eliminates the effects of the empty spaces between the flights and also reduces the size of clumps which fall off of end edge 82 when the material being dispensed is damp.

Specifically, end edge 82 is angled with respect to transverse lip 26 and to axis A to reduce or eliminate the time periods during which there is no material being dispensed over the dispensing edge 82. As can be seen in FIG. 4A, there is no material M directly over transverse lip 26. If the flow plate 66 were not present, a pause in the dispensing of material would occur until the material being moved by the next flight arrived at transverse lip 26. However, because flow plate 66 underlies a portion of flighting 54, material continues to be dispensed over dispensing edge 82 even after flighting 54 has passed over transverse lip 26. As material being pushed by a flight nears wall 30, more material being propelled by the following flight begins to drop off of terminal lip 26 and dispensing edge 82. In this manner, the pauses in the dispensing of material are reduced or eliminated. Additionally, because the angle BA between dispensing edge 82 and flighting 54 is much greater than angle FA between the flighting and transverse lip 26, it takes much longer for flighting 54 to pass over edge 82 than to pass over transverse lip 26. This extends the time period over which material is dispensed to even the flow rate thereof. In addition, this configuration allows only small amounts of damp material to overhang the channel end before falling into opening 16. These smaller lumps L are shown in FIG. 4B.

Any angle between transverse lip 26 and dispensing edge 82 will provide some benefit over a dispensing edge transverse to axis A such as transverse lip 26. Ideally, however, the angle will be related to the pitch length P such that there is always a portion of flighting 54 positioned above dispensing edge 82. Angle CA between the dispensing edge and axis A should also be related to the flighting width B to maximize the benefits obtained with this invention. This is best understood in reference to FIG. 10, wherein it is apparent that flow plate 66 includes a triangular portion 69 defined by dispensing edge 82, a line 83 and a first portion 77 of lateral edge 78. Line 83 is approximately equal to pitch length P. Portion 77 of lateral edge 78 should be selected to be approximately equal to one half of auger width B. Because dispensing edge 82 forms the hypotenuse of a right triangle having portion 77 and line 83 as legs, the length of dispensing edge 82 is equal to the square root of $(p^2+(B/2)^2)$. This results in angle CA being equal to arctan B/2A, angle FA between flighting 54 and transverse lip 26 being equal to 90-PA, and angle BA, the acute angle between flighting 54 and dispensing edge 82 being equal to 180(PA+CA). With a standard auger, angle CA is generally in the range of 30 to 35 degrees and preferably about 32 degrees, angle FA is about 15 degrees, and angle BA is about 65 to 70 degrees. While these angles have been found to give optimal results, minor deviations therefrom will not significantly affect the performance of this device.

Figure 13:
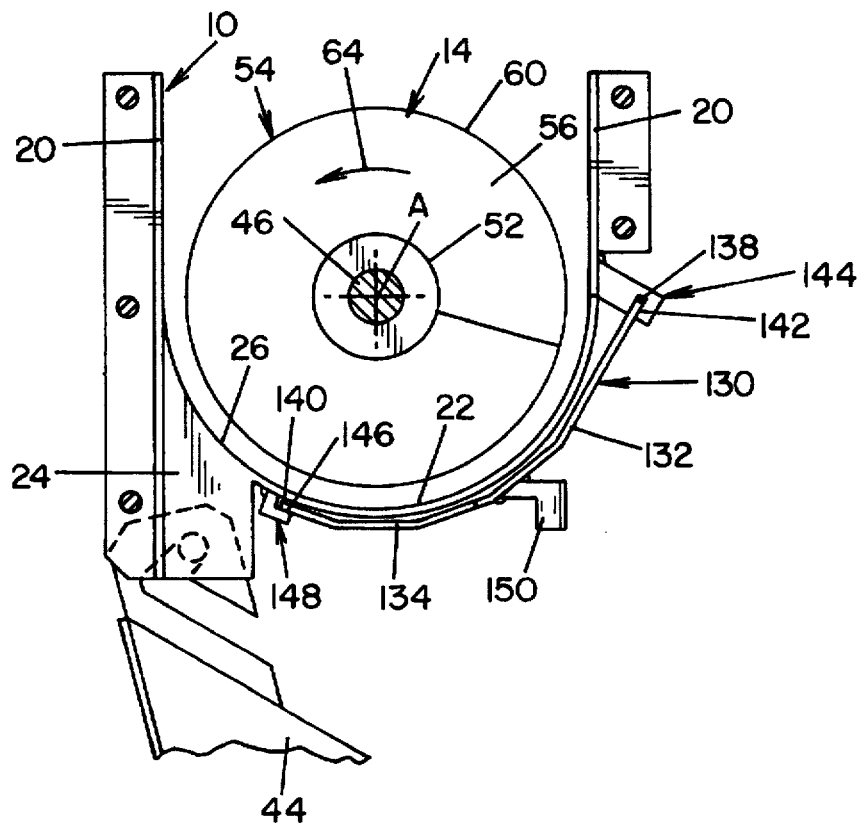
FIG. 13 is an end elevation view of a spreader illustrating a second embodiment of an extension plate according to the subject invention.
Figure 14:
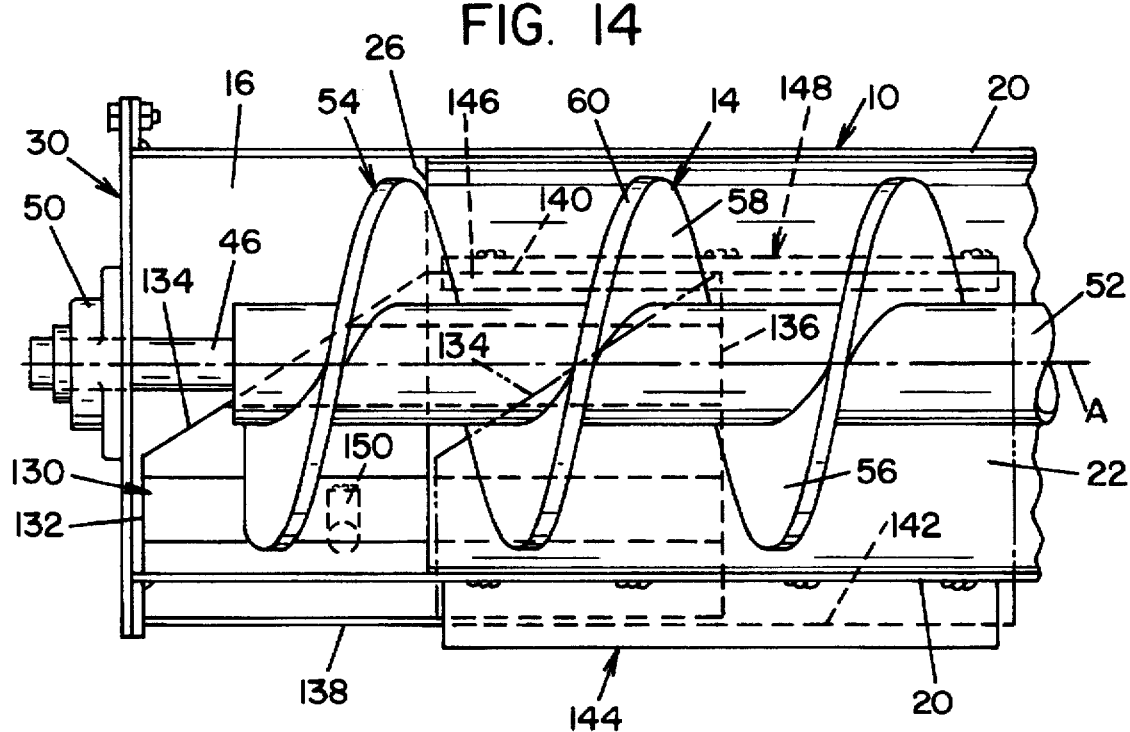
FIG. 14 is a plan view of the spreader and extension plate shown in FIG. 13.

FIGS. 13 and 14 show a second embodiment of the subject invention wherein identical numerals are used to identify parts common to both embodiments. In this embodiment, flow plate 130 is axially slidably mounted beneath channel 10 for axial movement parallel to channel 10 and auger 14. Flow plate 130 has an axially outer edge 132 and an angled laterally inner side edge 134, which edges are correspond respectively to edges 80 and 82 of flow plate 66 in the first embodiment. Flow plate 130 also includes an axially inner edge 136 spaced from outer edge 132 and a laterally outer side edge 138 extending between edges 132 and 136, and a second laterally inner side edge 140 extending between angled edge 134 and edge 136. This results in a plate identical to plate portion 67 of flow plate 66, except for the rectangular extension provided by edge 140 and a corresponding axial portion of edge 138, and which extension underlies lip 26 of channel 10 when flow plate 130 is in the use position shown in solid lines in FIG. 14. Side edge 138 is slidably mounted in a first slot 142 parallel to channel 10 in a first support 144 attached to channel 10, and side edge 140 is slidably mounted in a second slot 146 parallel to channel 10 in a second support 148 attached beneath channel 10. A control rod 150 which is fixedly secured to the bottom of flow plate 130 such as by welding provides a handle for manually sliding plate 130 axially of channel 10 between the use position and the non-use position shown by broken lines in FIG. 14. When fully extended or fully retracted, flow plate 130 functions like flow plate 66 in its use and non-use positions, respectively.

The present invention has been described in terms of two preferred embodiments which are in no way intended to limit the scope of the present invention. Obvious modifications will become apparent to those skilled in the art upon reading this specification, and all such modifications are intended to comprise a part of this invention to the extent that they are covered by the following claims.

I claim:

1. A device for dispensing particulate material comprising:
   a channel having a bottom axis, a terminal end wall, and a dispensing edge defined by the junction of said bottom and said end wall; and
   rotatable screw conveyor means in said channel for moving said particulate material axially toward said dispensing edge;
   wherein said dispensing edge is angled at an acute angle to said axis.

2. A device according to claim 1, wherein said conveyor means includes an end portion disposed above said dispensing edge.

3. A device according to claim 2, wherein said conveyor means comprises a plurality of flights separated by a pitch length and said end portion has a length approximately equal to said pitch length.

4. A device according to claim 3, wherein said conveyor means is an auger having a width normal to said axis.

5. A device according to claim 4, wherein said dispensing edge has a length related to said auger width and said pitch length.

6. A device according to claim 4, wherein said auger width is equal to a length B, said pitch length is equal to a length P and said dispensing edge has a length equal to the square root of $(p^2+B^2/4)$.

7. A device according to claim 4, wherein said acute angle is determined by said auger width and said pitch length.

8. A device according to claim 4, wherein said auger width is equal to a length B, said pitch length is equal to a length P and said acute angle is equal to arctan B/2P.

9. A device for dispensing particulate material comprising:
   a conveyor channel having an axis, a generally U-shaped contour transverse to said axis and a terminal end;
   auger means in said channel and having a helical flighting relative to said axis for moving said material along said channel toward said terminal end; and
   plate means at said terminal end, movable relative to said conveyor channel, providing a dispensing edge extending at an angle to said flighting for said flighting to move relative to said dispensing edge whereby said material is moved along said plate in a direction parallel to said axis and dispensed over said dispensing edge.

10. A device according to claim 9, including support means supporting said plate means on said conveyor channel for displacement relative thereto between use and non-use positions.

11. A device according to claim 9, including support means on said conveyor channel laterally spaced from said auger means, said plate means being pivotably attached to said support means for movement between a first position wherein said dispensing edge underlies said auger means and a second position wherein said dispensing edge is disposed below said support means.

12. A device according to claim 9, wherein said terminal end includes a terminal edge and said plate means is axially slidably mounted on said conveyor channel for displacement between a first position wherein said dispensing edge is spaced axially outwardly of said terminal edge and a second position wherein said dispensing edge is spaced axially inwardly of said terminal edge.

13. A device according to claim 12, further including locking means for locking said plate means in said first and said second position.

14. A device according to claim 9, wherein said flighting has a pitch angle of about 75 to 80 degrees.

15. A device according to claim 9, wherein said angle between said dispensing edge and said axis is about 30 to 35 degrees.

16. A device according to claim 9, wherein said dispensing edge is angled about 32 degrees with respect to said axis.

17. A device according to claim 9, wherein said flighting crosses said terminal end at an angle of about 15 degrees.

18. A device according to claim 17, wherein said flighting crosses said dispensing edge at an angle of 65 to 75 degrees.

19. A device according to claim 9, wherein said angle between said dispensing edge and said axis is about 32 degrees and said flighting crosses said terminal end at an angle of about 15 degrees.

20. In a device for dispensing particulate material comprising a conveyor channel having an axis and a terminal end having a semicircular bottom, and rotatable screw conveyor means disposed in said channel for moving said particulate material in a direction of flow toward said terminal end, the improvement comprising: plate means mounted on said conveyor channel adjacent said terminal end for providing an axial extension of said channel, said plate means comprising a sheet portion, a terminal end wall and a dispensing edge defined by the junction of said sheet portion and said terminal end wall wherein said dispensing edge extends away from said terminal end at an acute angle to said axis.

21. The improvement of claim 20, wherein said plate means is moveable relative to said channel between use and non-use positions, said dispensing edge in said use position being spaced axially from said terminal end.

22. The improvement of claim 20, wherein said plate means comprises a trapezoidal plate having a side edge generally parallel to said axis, said dispensing edge extending at an angle less than 90° relative to said side edge.

23. The improvement of claim 22, wherein said trapezoidal plate includes a plurality of bends generally parallel to said axis and dividing said plate into a plurality of laterally adjacent planar sections.

24. The improvement of claim 23, wherein laterally adjacent ones of said plurality of sections meet at an angle of about 20 degrees.

25. The improvement of claim 24 wherein said plurality of sections include a first end section lying in a first plane and a second end section lying in a second plane, said first plane and said second plane intersecting at an angle of approximately 70 to 90 degrees.

26. The improvement of claim 25, wherein said first plane and said second plane intersect at an angle of about 80 degrees.

27. In a device for dispensing particulate material comprising a conveyor channel having an axis and a terminal end having a semicircular bottom, and rotatable screw conveyor means disposed in said channel for moving said particulate material in a direction of flow toward said terminal end, the improvement comprising: plate means mounted on said conveyor channel adjacent said terminal end for providing an axial extension of said channel, said plate means including a dispensing edge extending away from said terminal end at an acute angle to said axis and having an axially inner edge, an axially outer edge parallel to said inner edge, a side edge parallel to and laterally spaced from said axis and extending between said inner and outer edges, and said dispensing edge extending between said inner and outer edges.

28. The improvement according to claim 27, wherein said plate is curved between said side edge and said dispensing edge for a portion of said plate to correspond generally to the curvature of said bottom of said end of said channel.

29. The improvement device according to claim 27, wherein said plate includes a plurality of adjacent planar sections between said side edge and said dispensing edge, said sections being at an angle with respect to one another for a portion of said plate to correspond generally to the curvature of said bottom of said end of said channel.

30. The improvement according to claim 29, wherein said planar sections include first, second, third, fourth and fifth planar sections adjacent one another respectively from said side edge, and said adjacent sections being integral along fold lines therebetween.

31. The improvement of claim 30, wherein said angle between said sections is about 20 degrees.

32. A method of evening the output of particulate material being dispensed from an end of a conveyor trough having a bottom and a terminal end wall and a dispensing edge defined by the junction of said bottom and said terminal end wall by a rotatable auger having an axis in said trough comprising the steps of: angling said dispensing edge at an acute angle to said axis and rotating said auger relative to said dispensing edge for said auger to move material in a direction parallel to said axis and toward said dispensing edge.

33. A device for dispensing particulate material comprising:

trough means;

means providing said trough means with end edge means;

auger means having flight means for moving said material along said trough in a flow direction toward said end edge means;

said flight means extending across said end edge means; and said means providing said trough means with end edge means having a first position relative to said trough means wherein said end edge means is an edge normal to said flow direction and a second position wherein said end edge means is an edge extending at an acute angle with respect to said flow direction.

* * * * *